W. ROSENBAUM.
Horse-Detaching Devices.

No. 151,314. Patented May 26, 1874.

WITNESSES:

INVENTOR:
W. Rosenbaum
BY
ATTORNEYS.

UNITED STATES PATENT OFFICE.

WILLIAM ROSENBAUM, OF CHEYENNE, WYOMING TERRITORY.

IMPROVEMENT IN HORSE-DETACHING DEVICES.

Specification forming part of Letters Patent No. 151,314, dated May 26, 1874; application filed April 8, 1874.

*To all whom it may concern:*

Figure 1:
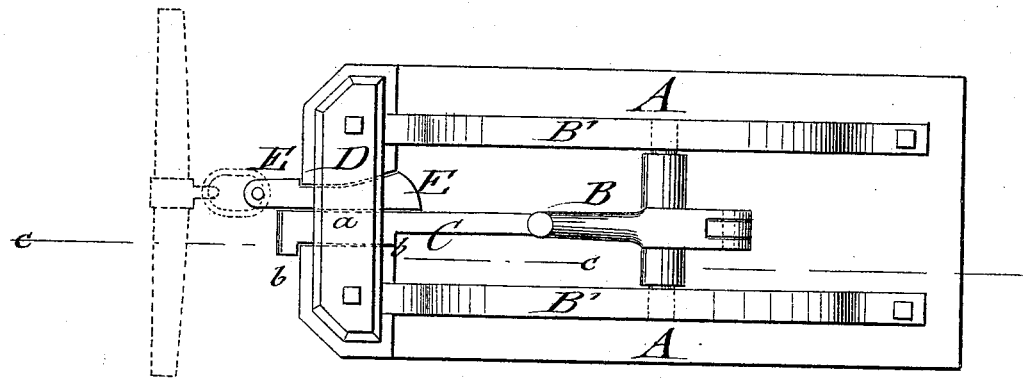
Figure 3:
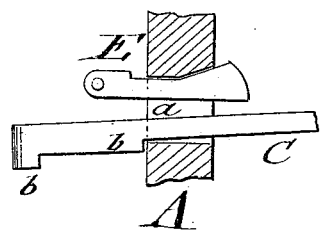
Figure 2:
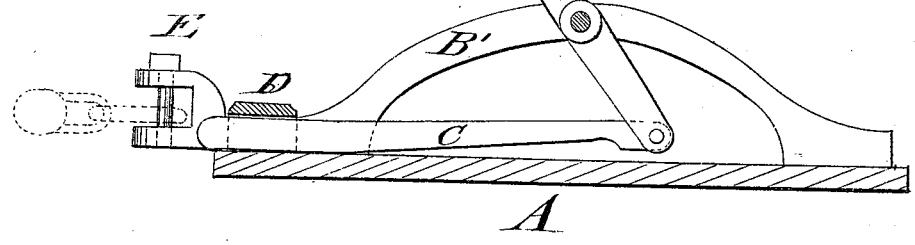

Be it known that I, WILLIAM ROSENBAUM, of Cheyenne, in the county of Laramie and Territory of Wyoming, have invented a new and Improved Device for Detaching Horses, of which the following is a specification:

In the accompanying drawing, Figure 1 represents a top view; Fig. 2, a vertical longitudinal section of my improved device for detaching horses, taken on the line *c c*, Fig. 1; and Fig. 3, a detail top view of the sliding bar and detachable wedge-clevis.

Similar letters of reference indicate corresponding parts.

The object of my invention is to produce a device for detaching horses at any moment from carriages, buggies, wagons, reapers, mowers, or other vehicles, so that not only the individuals, but also the vehicles, are protected against injury from runaway or vicious horses.

My invention consists of a lever attachment to the pole or tongue of the vehicle, which may be operated from the seat so as to detach a clevis with wedge-shaped end, to which the double-tree is applied.

In the drawing, A represents a base-plate of suitable dimensions, which is clasped, bolted, or otherwise firmly attached to the pole or tongue of the vehicle. A hand-lever, B, is pivoted to suitable bearings B', which are cast or otherwise applied to base-plate A, and reaches with its upper arm up to the front board of the vehicle, to be operated from the seat at any moment. The lower end of lever B is pivoted to a sliding bar, C, which is guided in a recess, *a*, formed by lateral piece D, cast or screwed to the front end of plate A. The sliding bar C is provided with step-shaped shoulders or side projections *b* at its front end, of which the outer step defines the extent of rear motion of bar C, while the inner step slides along the side of recess *a*, so that by the forward motion of the same beyond the recess, a greater space is available in the recess for the narrow part of bar C. The opposite side of recess *a* is shaped under an obtuse angle, fitting the wedge-shaped end of clevis E, which is firmly retained therein as long as the broader end of sliding bar C closes the recess and locks thereby the clevis end. The front end of clevis E takes up the connecting-ring of the single or double tree in the usual manner.

The device is operated as follows: The wedge-shaped end of clevis E is applied rigidly to the base-plate by carrying the hand-lever forward, which draws the sliding bar back and locks the wedge end of the clevis into the recess. In case of any accident or danger the horses may be instantly detached by pulling the hand-lever back, which forces the sliding bar beyond its guide-recess and gives sufficient play to the wedge-clevis to slide out. The horses carry then the double-tree along with them, leaving the vehicle behind, preventing by this simple attachment injury and damage to the person or vehicle.

Having thus described my invention, I claim as new and desire to secure by Letters Patent—

The device for detaching horses from vehicles, consisting of base-plate A, with guide-recess *a*, sliding bar C, pivoted hand-lever B, and detachable wedge-clevis E, combined to operate substantially as and for the purpose set forth.

WILLIAM ROSENBAUM.

Witnesses:
 M. V. BOUGHTON,
 JAMES P. JULIEN.